July 25, 1939.　　　H. A. HADLEY　　　2,167,204
AUTOMATIC BEAM STOP
Filed Dec. 9, 1937　　　2 Sheets-Sheet 1

INVENTOR
Harlan A. Hadley
BY
ATTORNEY

July 25, 1939.   H. A. HADLEY   2,167,204
AUTOMATIC BEAM STOP
Filed Dec. 9, 1937   2 Sheets-Sheet 2

INVENTOR
Harlan A. Hadley
BY
ATTORNEY

Patented July 25, 1939

2,167,204

UNITED STATES PATENT OFFICE 2,167,204

AUTOMATIC BEAM STOP

Harlan A. Hadley, St. Johnsbury, Vt., assignor to Fairbanks, Morse and Company, Chicago, Ill., a corporation of Illinois Application December 9, 1937, Serial No. 178,846

20 Claims. (Cl. 265—49)

This invention relates to automatic beam stops for weighing scales, and is adapted particularly for use with automatic dial scales.

An important object of the invention is to provide beam stop means associated with the beam and carrying beam stop control means which is adapted to be automatically raised and lowered in accordance with the movement of the beam and thus permit the beam stop means to follow the balancing movement of the beam until the beam reaches its balanced position.

Another important object of the invention is to provide operating means yieldingly connected to the beam stop control means for automatically limiting thereby the free travel of the beam and thus gradually stopping its oscillations until it arrives at its balanced position. By this arrangement the operating means is adapted to automatically follow the beam stop means and to raise and lower the beam stop means in accordance with the balancing movement of the beam and thus relieve the beam and weighing mechanism of any shock or excessive stress imposed thereon by the applied load.

Still another object is to provide electrically operated actuating means for automatically controlling the movement of the beam stop operating means and adapted thereby to alternately raise and lower the beam stop operating means in accordance with the movement of the beam until the beam reaches its balanced position and thus allow the indicator to come quickly to its correct weight indicating position without throwing any excessive strain on the scale indicating mechanism.

In order that the nature of my invention may be fully understood, I have illustrated certain embodiments of the invention, in which.

Figure 1:
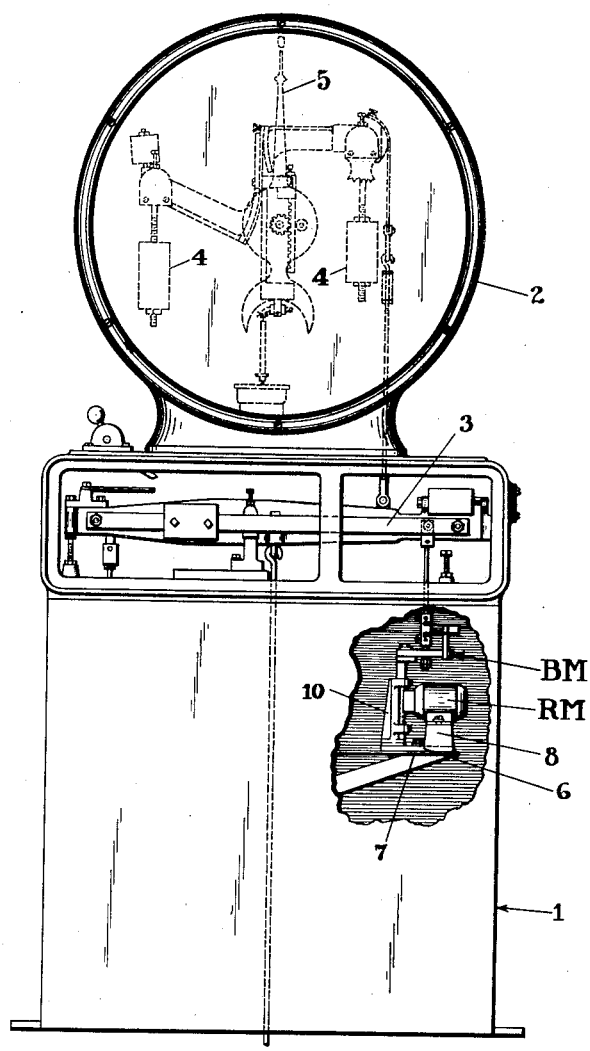
Figure 1 is a rear vertical elevation of an automatic dial scale showing the load offsetting and weight indicating mechanism in dotted outline, also showing in full outline the beam and co-operating parts, as well as the housing broken away so as to show the position of the co-operating beam stop mechanism with relation to the beam.

Referring to the drawings 1 designates an automatic dial scale provided in the dial head 2 with the usual beam 3, indicating mechanism including pendulums 4 of the load offsetting mechanism, and indicator 5. Located below the beam 3 is the beam stop operating mechanism BM which cooperates with beam stop control means associated with the beam, as will be hereinafter described, and includes a base plate 6 secured to a supporting bracket 7 and provided with spaced standards 8, upon which is mounted on laterally extending legs 9 a reversible electric motor RM which is in circuit with a source of electricity E. Attached by screws to the base plate 6 and positioned opposite the inner end of the reversible motor RM is a vertical bracket 10 which is provided with spaced, inwardly extending arms 11, between which a rectangularly sectioned actuating bar 12 for operating the beam stop mechanism is adapted to freely slide. The actuating bar 12 is held in its vertical position by spaced cross plates 13 secured to the ends of the arms 11 and is provided with a toothed operating rack 14 on its inner side, which meshes with a driving pinion 15 operatively connected to the shaft of the reversible motor RM. An inwardly extending horizontal plate 16 is mounted at the upper end of the slidable bar 12 and has attached thereto a contact supporting plate 17, to the inner end of which is attached an upright contact carrying plate 18.

Mounted on a transverse insulating block 19, secured to an extension 18a of the upright contact plate 18, are four spaced laterally extending, resilient contact carrying arms 20 forming part of the electrical switch mechanism, on the free ends of which are mounted spaced pairs of upper and lower electrical contacts 21 and 22 respectively, each pair being opposed to the other pair and both being in circuit with the reversible motor RM. By this means electric current is transmitted from the source of electricity E to the reversible motor in order to operate the actuating bar 12 and consequently the beam stop mechanism as hereinafter described. By mounting the contactors 21 and 22 on resilient arms 20 the operating means BM is yieldingly connected to the beam stop control means CU, whereby any jamming of the co-operating parts under a sudden shock or stress due to the load on the scale is obviated.

The beam 3 has operatively associated therewith the primary beam stop mechanism including a depending beam stop member or rod 23, the upper end of the rod being pivotally mounted on a transverse pin 24 carried by the spaced arms 25 of a clevis block 26, which is preferably attached to the beam 3, although obviously any suitable means co-operating with the beam may be employed to effect operative union of the beam stop rod 23 with the beam 3. Connected to the beam stop rod 23 is the beam stop control and electrical circuit closing member or unit CU, which includes a cylindrical circuit closing member 27, secured to the threaded lower end of the beam stop rod 23. The circuit closing member 27 is provided with a reduced, threaded extension 28, which extends freely through an elongated opening 29 in the contact supporting plate 17 and carries on its threaded end an adjusting nut 30 and a lock nut 31, the adjusting nut 30 and the lower end of the circuit closing member 27 serving to control and limit the free movement of the beam stop control unit CU and the beam stop member 23 up and down as the beam is raised and lowered until it reaches its balanced position.

Figures 2, 3:
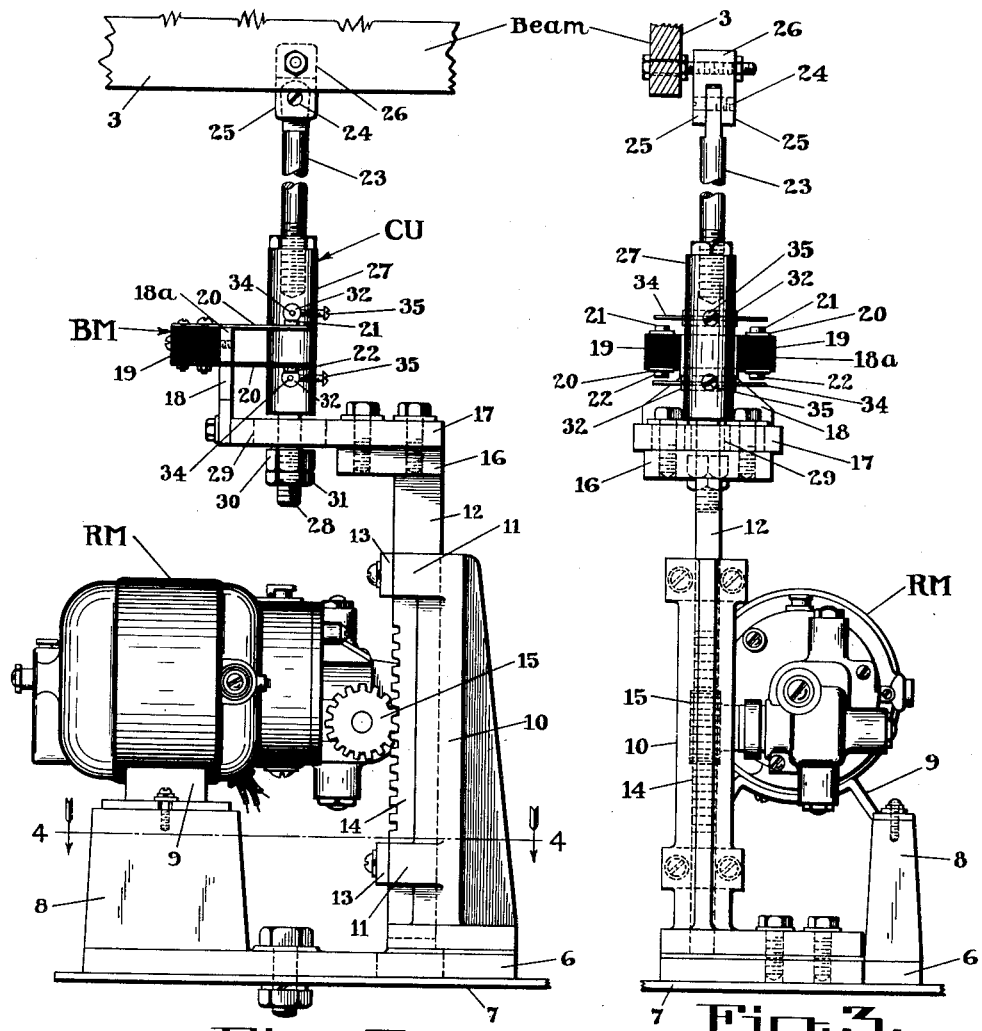
Figure 2 is an enlarged vertical elevation of the beam stop showing its attachment to the beam.
Figure 3 is an enlarged vertical side elevation of the beam stop mechanism shown in Fig. 2.
Figure 5:
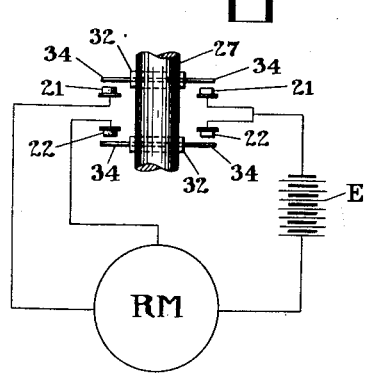
Figure 5 is a wiring diagram of the electric circuit of the beam stop electrical control.
Figure 4:
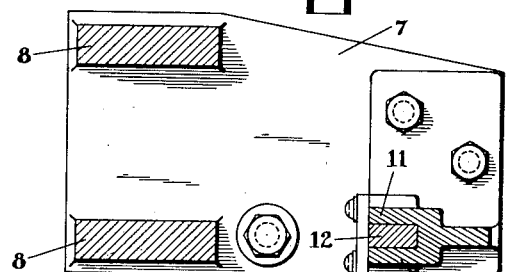
Figure 4 is a top plan view, on the line 4—4 of Fig. 2, showing the base plate of the beam stop mechanism and the arrangement thereon of the various supports.

The beam stop control unit CU, moreover, is raised and lowered in accordance with the movement of the beam, under control of the operating mechanism BM, which is automatically actuated by electrically operated actuating means under control of the circuit closing member 27 of the beam stop control unit CU, as hereinafter described, in controlling and permitting the beam stop rod 23 to follow the balancing movement of the beam 3. Mounted in tubular insulators 32 inserted in transverse openings 33 in the circuit closing member 27 are two laterally extending and opposed circuit closing contactor arms 34 secured therein by set screws 35 and preferably made of tungsten. The contactor arms 34 are adapted to engage either the upper or lower contacts 21 and 22 carried by the operating mechanism BM as the beam is raised or lowered in arriving at its balanced position, when the beam stop control unit CU and the operating mechanism BM will assume their free or neutral positions (Figs. 2 and 3). Thus in each case the circuit controlling the reversible motor RM is closed and its forward or reverse rotation is thus affected accordingly, thereby raising or lowering the actuating bar 12 and beam stop control unit CU and thus limiting the free travel of the beam and gradually stopping the oscillations of the beam until it arrives at its balanced position.

In operation the beam normally moves up and down under influence of the load, carrying with it the beam stop rod 23 with its beam stop control and circuit closing unit CU, which unit automatically controls, as has been previously described, the closing of the circuit to the reversible motor RM, thereby causing the actuating bar 12 and the co-operating beam stop rod 23 to be moved up or down accordingly, so as to permit the beam stop rod 23 to follow the balancing movement of the beam 3 until it reaches its balanced position. By this means the indicator 5 is quickly controlled and positioned at the proper weight graduation without any drag on the indicating mechanism. However, when any undue stress or sudden shock is imposed on the scale mechanism due to excessive load or otherwise the beam stop mechanism limits the free travel of the beam 3, thereby preventing any shock reaching the co-operating parts and possible injury thereto. But the mechanism automatically and instantly acts in the manner described to move the beam stop bar 12 upwardly or downwardly as required until the beam 3 reaches its balanced position.

While I have shown a preferred embodiment of my invention it is evident that changes and modifications in the construction herein shown and described may be made that would come within the scope thereof and it is not intended, therefore, to limit the invention to the precise details of construction shown.

I claim:

1. Automatic beam stop mechanism co-operating with the beam of a scale, comprising a beam stop member associated with the beam and adapted to limit the free travel thereof, beam stop control means mounted on the beam stop member and adapted to raise and lower the beam stop member until the beam reaches its balanced position, and beam stop operating means automatically controlled by and adapted to follow the movements of the beam stop control means in raising and lowering the beam stop member until the beam reaches its balanced position.

2. Automatic beam stop mechanism co-operating with the beam of a scale, comprising a beam stop member associated with the beam and adapted to limit the free travel thereof, beam stop control means mounted on the beam stop member for raising and lowering the beam stop member until the beam reaches its balanced position, and beam stop operating means controlled by the beam stop control means and adapted to automatically follow the movement of the beam stop control means under control thereof.

3. Automatic beam stop mechanism co-operating with the beam of a scale, comprising a beam stop member associated with the beam and adapted to limit the free travel thereof, beam stop control means mounted on the beam stop member for raising and lowering the beam stop member until the beam reaches its balanced position, beam stop operating means controlled by the beam stop control means and adapted to automatically follow the movement of the beam stop control means under control thereof, a vertically movable actuating member operatively connected to the operating means, and electrical means controlled by the said beam stop control means for raising or lowering the said actuating member accordingly.

4. Automatic beam stop mechanism co-operating with the beam of a scale, comprising a beam stop member associated with the beam and adapted to limit the free travel thereof, beam stop control means mounted on the beam stop member for raising and lowering the beam stop member until the beam reaches its balanced position, beam stop operating means adapted to automatically follow the movement of the beam stop control means under control thereof, and electrically operated reversing means adapted under control of the said beam stop control means to move the beam stop control means up and down in accordance with the movement of the beam.

5. Automatic beam stop mechanism co-operating with the beam of a scale, comprising a beam stop member associated with the beam and adapted to limit the free travel thereof, beam stop control means mounted on the beam stop member and adapted to automatically co-operate with the beam stop member and thus permit the beam stop control means to follow the balancing movement of the beam, and electrically actuated operating means co-operating with and controlled by the beam stop control means and adapted to raise and lower the beam stop control means in accordance with the movement of the beam.

6. Automatic beam stop mechanism co-operating with the beam of a scale, comprising a beam stop member associated with the beam and adapted to limit the free travel thereof, beam stop control means mounted on the beam stop member, beam stop operating means yieldingly connected to the beam stop control means and adapted to follow its movements, and electrically operated actuating means co-operating with the beam stop operating means under control thereof and adapted to raise and lower the beam stop operating and control means in accordance with the movement of the beam.

7. Automatic beam stop mechanism co-operating with the beam of a scale, comprising a beam stop member associated with the beam and adapted to limit the free travel thereof, beam stop control means mounted on the beam stop member, beam stop operating means yieldingly connected to the beam stop control means and adapted to follow its movements, and an electrically operated slidable actuating member connected to the said operating means and adapted thereby to actuate the operating means under control of the beam stop control means.

8. Automatic beam stop mechanism co-operating with the beam of a scale, comprising a beam stop member associated with the beam and adapted to limit the free travel thereof, beam stop control means attached to the beam stop member, carrying opposed circuit closing contactor arms provided with electrical contacts and adapted to automatically follow the balancing movement of the beam, beam stop operating means yieldingly connected to the beam stop control means and provided with opposed contactor arms carrying electrical contacts adapted to co-operate with the contacts of the contactor arms of the beam stop control means, and electrically operated actuating means in circuit with and under control of the said electrical contacts adapted to bring the said contactor arms and contacts into operative engagement, and adapted thereby to control the movement of the operating and beam stop control means.

9. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, beam stop operating means yieldingly connected to the beam stop control means, a slidable actuating member provided with toothed actuating means and connected to the said operating means, and automatically controlled electrically operated driving means provided with toothed means co-operating with the said toothed actuating means of the actuating member in operating the beam stop control means as the beam is raised and lowered.

10. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, beam stop operating means yieldingly connected to the beam stop control means, a slidable toothed actuating rack co-operating with the said operating means, and automatically controlled electric means driving an actuating pinion engaging the said toothed rack and co-operating therewith in operating the said beam stop control means.

11. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, beam stop operating means yieldingly connected to the beam stop control means, electrically operated actuating means co-operating with the said operating means for controlling the upward and reverse movement thereof, and co-operating electrical control means carried by the beam stop control means and the operating means adapted to control thereby the said electrical actuating means upon the beam reaching the limit of its travel as it is raised and lowered.

12. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, beam stop operating means yieldingly connected to the beam stop control means, an actuating member co-operating with the said operating means, electrical means for controlling the movement of the actuating member including a reversible electric motor controlled by an electrical switch carried by the beam stop control and operating means and adapted to co-operate with and to effect the vertical and reverse movement of the said actuating member, and dual electric circuits in circuit with a source of electricity and the said electrical switch for operating the said motor, one circuit being adapted to be closed upon the upward movement of the beam stop means and the other circuit upon the downward movement thereof, thereby alternately operating the motor in a forward and reverse direction.

13. Automatic beam stop mechanism co-operating with the beam of a scale, comprising a beam stop member associated with the beam and adapted to limit the free travel thereof, beam stop control means attached to the beam stop member, carrying opposed circuit closing contactors and adapted to automatically follow the balancing movement of the beam, a vertically movable operating member carrying opposed contacts adapted to co-operate with the opposed contactors carried by the said beam stop control means, an actuating member attached to the oprating member, a reversible electric motor adapted to co-operate with and to effect the vertical and reverse movement of the actuating member, means for operatively connecting the reversible electric motor and the actuating member, and electric control means in circuit with a source of electricity for energizing the said motor and adapted to be opened and closed as the contactors engage the said contacts in accordance with the movement of the beam so as to thereby control the upward and downward movement accordingly of the said actuating member.

14. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, a vertically movable operating member co-operating with the beam stop control means, an actuating member connected to the operating member and provided with a toothed rack, a reversible electric motor in circuit with a source of electric current adapted to co-operate with and to effect the vertical and reverse movement of the actuating member, a driving pinion operatively connected to the said electric motor and meshing with the toothed rack of the actuating member and adapted to co-operate therewith in raising and lowering the actuating member and consequently the beam stop control member under operating control of the said reversible motor.

15. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, a slidable actuating bar adapted to be operatively connected to the beam stop control means, and reversible electrical means connected to the actuating bar for raising and lowering the said actuating bar in accordance with the movement of the beam stop control means.

16. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, an operating member having mounted thereon a lateral contact carrying plate adapted to be operatively connected to the beam stop control means, a slidable actuating bar connected to the operating member, reversible electrical means for controlling the movement of the said actuating bar under control of the beam stop control means, a circuit closing member forming part of the said beam stop control means and adjustably mounted on the said beam stop member and provided with opposed circuit closing contactors, and opposed contacts mounted on the said lateral contact plate of the operating member and adapted to operatively engage the said contactors of the circuit closing member in closing the circuit to the said electrical means and thereby causing the slidable actuating bar to be moved up and down in response to the movement of the beam.

17. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, a slidable actuating bar provided with a toothed rack adapted to be operatively connected to the beam stop control means, and reversible electrical means under control of the beam stop control means for controlling the movement of the said actuating bar provided with a toothed driving pinion co-operating with the said toothed rack in moving the slidable actuating bar up and down in response to the movement of the beam.

18. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, a slidable actuating bar having mounted thereon a lateral contact carrying plate adapted to be operatively connected to the beam stop control means, and reversible electrical means for controlling the movement of the said actuating bar, the said beam stop control means comprising a circuit closing member in circuit with the reversible electrical means and provided with a threaded reduced extension extending through an elongated opening in the said lateral contact plate and provided with an adjusting nut for adjusting the limit of travel of the circuit closing member in accordance with the movement of the beam.

19. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, a slidable actuating bar adapted to be operatively connected to the beam stop control means, reversible electrical means for controlling the movement of the said actuating bar, the said beam stop control means including a circuit closing member provided with laterally extending spaced and opposed contactor arms, and an operating member mounted on a lateral plate attached to the actuating bar having spaced and opposed contact carrying arms mounted on an insulating block, and provided with opposed pairs of upper and lower contacts adapted to be engaged by the said contactor arms of the circuit closing member as the circuit closing member is raised and lowered, whereby the circuit to the reversible electrical means is closed accordingly.

20. Automatic beam stop mechanism co-operating with the beam of a scale, comprising a beam stop member associated with the beam and adapted to limit the free travel thereof, beam stop control means attached to the beam stop member and adapted to automatically follow the balancing movement of the beam, a slidable actuating bar adapted to be operatively connected to the beam stop control means, reversible electrical means in circuit with a source of electric current for controlling the movement of the said actuating bar, the said beam stop control means comprising a circuit closing member adjustably mounted on the said beam stop member and provided with spaced and opposed contactor arms, an operating member mounted on a lateral plate secured to the actuating bar, a vertical contact carrying plate mounted on the inner end of the said lateral plate, and insulated spaced and opposed resilient contacts mounted on the said lateral plate and adapted to be operatively engaged by the contactor arms of the beam stop control means as the circuit closing member is raised and lowered in alternately closing the circuit to the said reversible electrical means while the beam is arriving at its balanced position.

HARLAN A. HADLEY.